US006316107B1

(12) United States Patent
Lubnin et al.

(10) Patent No.: US 6,316,107 B1
(45) Date of Patent: Nov. 13, 2001

(54) MULTIPLE PHASE POLYMERIC VINYL CHLORIDE SYSTEMS AND RELATED CORE-SHELL PARTICLES

(75) Inventors: Alexander V. Lubnin, Copley; Vic Stanislawczyk, Strongsville, both of OH (US)

(73) Assignee: PMD Group Inc., Breckville, OH (US)

( * ) Notice: Subject to any disclaimer, the term of this patent is extended or adjusted under 35 U.S.C. 154(b) by 0 days.

(21) Appl. No.: 09/287,918

(22) Filed: Apr. 7, 1999

(51) Int. Cl.[7] ............................................. B32B 5/16

(52) U.S. Cl. ........................ 428/407; 525/217; 525/230; 525/239

(58) Field of Search .......................... 428/407; 525/217, 525/230, 239

(56) References Cited

U.S. PATENT DOCUMENTS

| | | | |
|---|---|---|---|
| 3,793,402 | 2/1974 | Owens | 260/876 R |
| 4,002,801 | 1/1977 | Knechtges et al. | 428/474 |
| 4,041,106 | 8/1977 | Ide et al. | 260/876 R |
| 4,179,481 | 12/1979 | Tuzuki et al. | 525/80 |
| 4,771,086 | * 9/1988 | Martin | 523/205 |
| 4,797,344 | * 1/1989 | Nakahara et al. | 430/138 |
| 4,970,193 | 11/1990 | Liang et al. | 503/201 |
| 5,216,044 | * 6/1993 | Hoshino et al. | 523/201 |
| 5,237,004 | 8/1993 | Wu et al. | 525/85 |
| 5,278,234 | 1/1994 | Nishino et al. | 525/84 |
| 5,346,954 | 9/1994 | Wu et al. | 525/85 |
| 5,427,996 | 6/1995 | Motoda et al. | 503/200 |
| 5,607,769 | 3/1997 | Choate | 428/408 |
| 5,614,049 | 3/1997 | Kohlhammer et al. | 156/221 |
| 5,686,528 | * 11/1997 | Wills et al. | 525/68 |
| 5,773,520 | * 6/1998 | Bertelo et al. | 525/309 |
| 6,084,009 | * 7/2000 | Mizoguchi et al. | 523/201 |

OTHER PUBLICATIONS

Air Products and Chemicals, Inc., Polymer Chemicals Technical Report, 1986, pp. 1–8.

Polymer, 1980, vol. 21, Nov., "Compatibility of Polyacrylates and Polymethacrylates with Poly(Vinyl Chloride): 1. Compatibility and Temperature Variation", D.J. Walsh et al., pp. 1330–1334.

Polymer, 1980, vol. 21, Nov., "Compatibility of Polyacrylates and Polymethacrylates with Poly(Vinyl Chloride): 2. Measurement of Interaction Parameters", D.J. Walsh et al., pp. 1335–1340.

Polymer, 1984, vol. 25, Apr. "The Miscibility of Polyacrylates and Polymethacrylates with PVC: In Situ Polymerization and the Miscibility of Poly(Methyl Acrylate) and Poly(Ethyl Acrylate) with PVC", D.J. Walsh et al., pp. 495–498.

Polymer, 1982, vol. 23, Dec., "The In Situ Polymerization of Vinyl Chloride in Poly(Butyl Acrylate)", D.J. Walsh et al., pp. 1965–1970.

Makromol. Chem., Suppl. 1/11, pp. 403–418, 1985, Norbert Sutterlin, "Structure/Properties of Emulsion Copolymers".

(List continued on next page.)

Primary Examiner—Hoa T. Le
(74) Attorney, Agent, or Firm—Thoburn T. Dunlap; George W. Moxon, II

(57) ABSTRACT

An emulsion or suspension polymer comprising a vinyl chloride polymeric core and an acrylic ester-acrylonitrile polymeric shell is disclosed. The emulsion polymer is preferably prepared using a two-stage process. In the first stage, a vinyl chloride monomer is polymerized or copolymerized to form a first phase of a polymeric hard core having a relatively high chlorine content. In a second stage, the soft acrylic ester—acrylonitrile copolymer is made in situ in a reaction mixture comprising the first phase. The product provides both flame retardancy and low MFFT, and is useful in a variety of coating and binding applications.

33 Claims, 2 Drawing Sheets

OTHER PUBLICATIONS

Rubber Chemistry and Technology, 1973, A.H. Jorgensen et al., B.F. Goodrich Chemical Company, Technical Center, Avon Lake, "Multiple Glass Transitions in Butadiene–Acrylonitrile Copolymers. II. Formation of Incompatible Phases During Copolymerization", pp. 1087–1102.

ASTM Designation: D 2863–95, "Standard Test Method for Measuring the Minimum Oxygen Concentration to Support Candle–Like Combustion of Plastics (Oxygen Index)", 1995, pp. 1–5.

* cited by examiner

MULTIPLE PHASE POLYMERIC VINYL CHLORIDE SYSTEMS AND RELATED CORE-SHELL PARTICLES

BACKGROUND OF THE INVENTION

This invention relates to emulsion polymers, which provide flame retardancy, and processes for making such polymers. The emulsion polymerization processes employed forms non-homogeneous particles, such as core-shell particles. More particularly, the invention is directed to a latex where the particles have a relatively hard, vinyl chloride containing core and a relatively soft acrylic shell. The latexes are useful in coatings, as well as textile and nonwoven applications. They provide, in addition to flame retardancy, improved film forming properties, chemical resistance, abrasion resistance, and heat and/or dielectric sealability.

Currently copolymers based on ethylene and vinyl chloride are used as flame-retardant binders for woven and nonwoven fabrics. These copolymers are considered to exhibit a good overall balance of required properties. However, one of the drawbacks of this technology is that production of polymeric products based upon ethylene-vinyl chloride copolymers requires relatively expensive high pressure equipment due to the high pressure of ethylene during polymerization, and so these polymers tend to be expensive to manufacture.

Acrylate/vinyl chloride copolymers would be expected to be less expensive to manufacture, since they can be made in less expensive, lower pressure rated equipment. But, in order to deliver flame retarding properties, compositions based upon such copolymers require a relatively high chlorine content. Generally, the higher the chlorine content, the higher the minimum film-forming temperature (MFFT) and the harder or stiffer the hand. So, generally speaking, compositions based upon acrylate-vinyl chloride copolymers, where there is a high chlorine content, generally exhibit relatively high and undesirable, MFFT's. The MFFT is the temperature point at which the latex will form a continuous film. It is often desirable that the latex function, for example, as a binder at room temperature or below. Therefore, high MFFT's mean that the utility of the latex is limited.

One approach to alter the properties of emulsion polymers utilized in multiple-phase latex systems to make low MFFT latexes based on hard monomers, i.e., monomers exhibiting a relatively high polymer glass transition temperature (Tg), has been to form a soft shell (usually acrylic based) around a hard core (such as formed from styrenic or methacrylic monomers). Poly(vinyl chloride) and vinyl chloride copolymers are of particular interest as core materials due to their flame retardancy; oil, chemical, and water resistance; strength; abrasion resistance; compoundability; and low cost. However, polymers made of acrylic and methacrylic monomers, particularly those with an alkyl side chain of up to six carbon atoms, ie., methyl through hexyl (meth) acrylates, including commercially used ethyl and n-butyl acrylates, are miscible with PVC. See D. J. Walsh et al., Polymer, 25, 495 (1984); 23, 1965 (1982); and 21, 1330 (1980).

To create core-shell structures, the multiple polymer phases must phase separate by virtue of their immiscibility, by their lack of interdiffusion, or by some other process. If phase separation does not occur or is not maintained in the finished emulsion polymeric particles, then the behavior of the polymeric particle may approach that of a particle formed from a homogeneous alloy of polymers. The result is generally inferior properties as compared to phase separated particles in which the particle morphology, or the location of the phases within the particles, can be controlled. It is understood that the level of phase separation of polymer phases in core-shell particles is never complete. Some degree of miscibility will be apparent at the interphase, and core-shell particles may be produced with significant levels of miscibility between the phases. The extent of phase separation, however, is a critical parameter in controlling the final morphology of the polymer particles, and thus the performance of the final emulsion produced. Since many common acrylate polymers are miscible with PVC, they tend not to phase separate from PVC. Thus, the particle morphologies created are often undesirable.

European Patent Application No. 0 810 240 A1 (assigned to Elf Atochem) teaches a latex in the form of particles having a vinyl chloride core and an external acrylate copolymer layer, which is for use in paints and plastisols. The external acrylate copolymer is formed from the polymerization of monomer(s) which could be alkyl methacrylates or acrylates, where the alkyl group is between 1 and 8 carbon atoms, and/or vinyl esters of mono and polycarboxylic acids, and in the presence of a vinyl chloride seed polymer via a suspension polymerization process. Although the application discloses that the weight ratio of vinyl chloride seed polymer to external monomers can be between 0.02 and 10, in fact, in all the examples, the ratios employed were 50% by weight or less. Therefore, the compositions taught by the Elf Atochem patent application would be considered not to be suitable for providing flame retardancy.

The core-shell composition of the present invention overcomes the inherent obstacles of both the ethylene—vinyl chloride copolymers and the PVC core—acrylic shell polymers such as described in European Patent Application No. 0 810 240 A1, and provides a low MFFT in conjunction with high chlorine content, thereby yielding excellent flame retardancy. Other benefits over existing technologies will become clear from the following description.

SUMMARY OF THE INVENTION

The present invention is the result of the discovery that a polymer having a high chlorine content and a relatively low MFFT can be achieved with a latex having core-shell particles having a polymeric core component of a vinyl chloride polymer or copolymer, and a shell component disposed generally about the core component. The shell component is formed from (i) an acrylate monomer and (ii) an effective amount of an acrylonitrile monomer or any monomer containing a cyano group. The amount of acrylonitrile monomer employed for shell formation is enough that it promotes separation between the shell component and the core component. Generally, the expected result of the addition of acrylonitrile is to stiffen, rather than soften a polymer, as occurs in the present invention. Further, acrylonitrile usually increases the miscibility of polymers, such as for example, polybutadiene, in polyvinyl chloride, as opposed to the effect discovered in the present invention. The resulting particles of the present invention have two or multiple phases plus a high chlorine content, so that the latex composition possesses flame retardancy characteristics useful for textile and nonwoven applications, while providing a relatively low MFFT.

The system and resulting particles comprise a vinyl chloride polymer or copolymer constituting at least one phase of the system, or core of the particles; and an acrylic ester and acrylonitrile copolymer forming at least one other phase of the system, or shell of the particles. The invention also includes systems comprising multiple secondary phases or shells. The preferred morphology of the resulting latexes is a polyvinyl chloride (PVC) core phase encapsulated by an acrylic shell phase containing acrylonitrile monomer. Other less symmetrical morphologies are also included in the scope of the present invention.

In yet another aspect, the present invention provides a multiple phase polymeric system comprising a first phase including polyvinyl chloride or vinyl chloride copolymer and a second phase that generally encapsulates the first phase. The second phase is formed from polymerizing (i) an acrylate monomer and (ii) an effective amount of an acrylonitrile monomer.

In a further aspect, the present invention provides a method for promoting the separation between a first core phase and a second shell phase in a multiple phase polymeric system adapted for forming core-shell particles. The method comprises copolymerizing a vinyl chloride monomer to form the first core phase dispersed in a reaction mixture. Then, an acrylic monomer and an effective amount of an acrylonitrile monomer are added to the reaction mixture and polymerized in the presence of the first core phase to form the second shell phase.

DETAILED DESCRIPTION OF THE PREFERRED EMBODIMENTS

Figure 1:
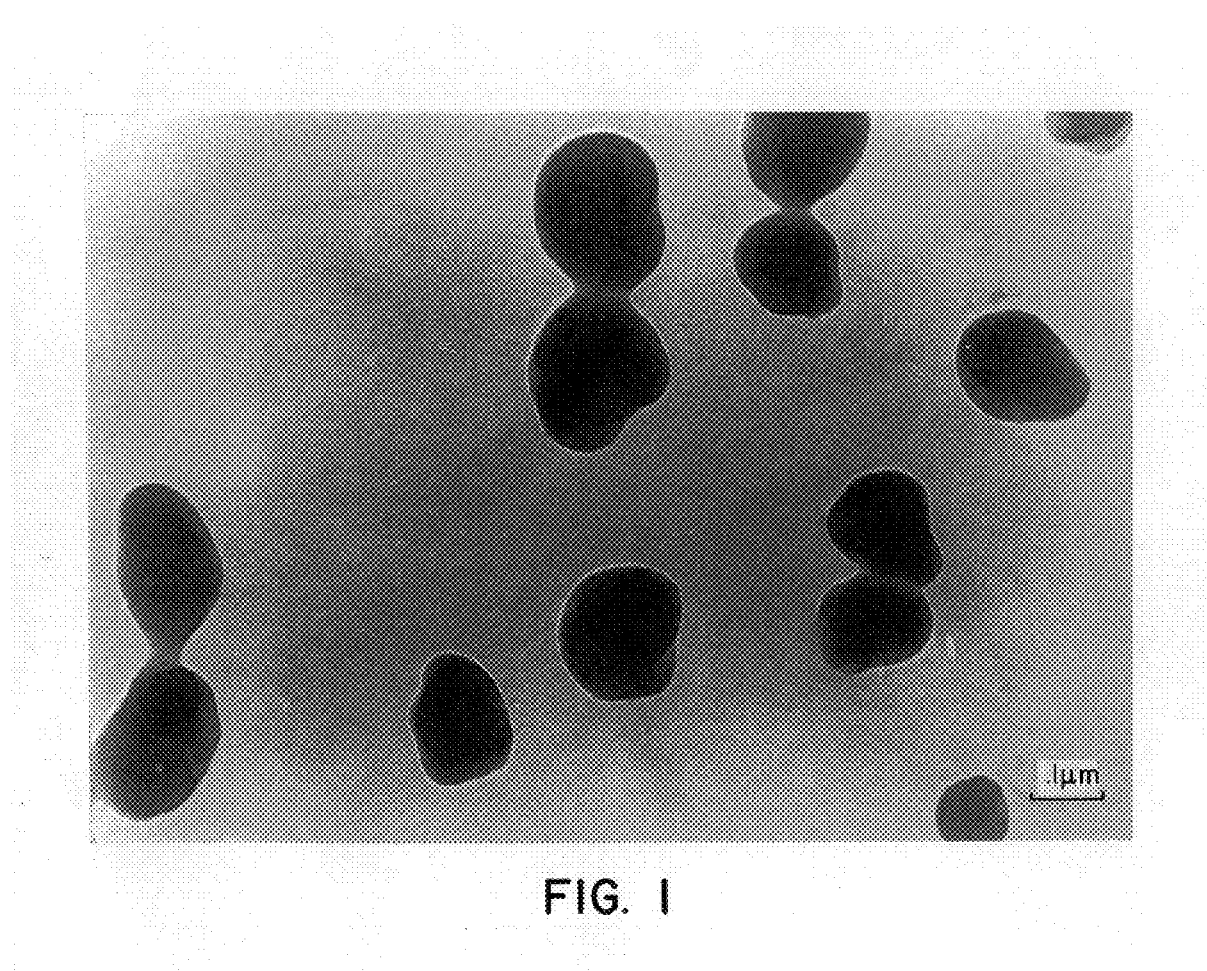
FIG. 1 is a photomicrograph of latex particles, made in accordance with the present invention, showing the core-shell nature of these particles.

The present invention relates to a core-shell composition, and related method of making, particularly useful for forming additive materials such as binders for nonwoven textiles and coverings. The materials are characterized as having an acrylate shell that exhibits a relatively low glass transition or film forming temperature and a PVC core that is relatively hard and/or rigid. Prior to the present invention, attempts to produce such core-shell binders have resulted in particles in which the soft acrylate shells tend to be miscible in the adjacent interior core layer thereby in essence, forming a polymer alloy. The resulting alloyed particles exhibit a single, or wide range of, glass transition temperatures. This is indicative of a polymer alloy. This is undesirable if a polymer with high chlorine content, yet low MFFT is needed. In such case, what is desired is a core-shell morphology in which the core and shell phases exist as distinct and separate structures.

The term "glass transition temperature" or "Tg" as used herein means a temperature at which a material changes from a glass-like solid state to a rubber-like state, and is measured by the change in specific heat or change in specific volume of the marterial observed. Differential thermal analysis (DTA method) or differential scanning calorimetry (DSC method) is utilized for the Tg measurement.

The present invention is based upon a discovery that by incorporating an acrylonitrile monomer into the acrylate shell component, separation between the PVC core and acrylate shell is significantly improved. The term "acrylonitrile" as used herein includes acrylonitrile, methacrylonitrile, or any monomer containing a cyano group, or mixtures thereof. The cyano containing monomers have the structure $CH_2=C(R)COOCH_2CH_2CN$, where R is selected from H, $C_nH_{2n=1}$, $CH_2=C(CN)_2$, $CH_3-CH=CH-CN$, $NC-CH=CH-CN$, and the like. The use of an acrylonitrile monomer as a comonomer during the stage of acrylic polymer formation effectively increases phase separation of polyacrylate from PVC. This results in superior properties of the resulting core-shell latexes. In particular, this practice yields lower minimum film-forming temperatures (MFFT's) in the resulting materials. In addition, the use of an acrylonitrile monomer enhances the physical properties of the resulting polymer or polymeric product, such as tensile strength. The present invention includes the use of other components in the core besides PVC, such as vinyl esters and (meth)acrylic compounds. In accordance with the present invention, the shell preferably comprises ethyl acrylate and/or n-butyl acrylate, and as previously noted, an acrylonitrile monomer. Other acrylic components for use in the shell are contemplated. Details of these aspects, and others, are set forth below.

The preferred embodiment emulsion polymer particles comprise a polymeric core phase and at least one polymeric shell phase. The core may be prepared from a variety of vinyl monomers. Preferably, the core is formed from polymerizing vinyl chloride monomers and optionally one or more comonomers. The vinyl chloride monomer is preferably copolymerized with the one or more other comonomers by free radical polymerization. Suitable comonomers for the core include any monomers capable of undergoing an emulsion copolymenzation with vinyl chloride such as alkyl (meth)acrylates and their derivatives, vinyl esters, (meth) acrylic and other polymerizable acids, acrylamide and its derivatives, vinylidene chloride, acrylonitrile, di- and multifunctional monomers. The selection of the particular comonomer is not critical to the present invention and will generally depend upon the properties sought for the application of the final polymer product.

Specific examples of suitable core comonomers include the following: (meth)acrylate esters such as methyl (meth) acrylate, ethyl (meth)acrylate, n-propyl (meth)acrylate, n-butyl (meth)acrylate, isopropyl (meth)acrylate, isobutyl (meth)acrylate, n-amyl (meth)acrylate, n-hexyl (meth) acrylate, isoamyl (meth)acrylate, 2-hydroxyethyl (meth) acrylate, 2-hydroxypropyl (meth)acrylate, N,N-dimethylaminoethyl (meth)acrylate, N,N-diethylaminoethyl (meth)acrylate, t-butylaminoethyl (meth)acrylate, 2-sulfoethyl (meth)acrylate, trifluoroethyl (meth)acrylate, glycidyl (meth)acrylate, benzyl (meth)acrylate, allyl (meth) acrylate, 2-n-butoxyethyl (meth)acrylate, 2-chloroethyl (meth)acrylate, sec-butyl-(meth)acrylate, tert-butyl (meth) acrylate, 2-ethylbutyl(meth)acrylate, cinnamyl (meth) acrylate, crotyl (meth)acrylate, cyclohexyl (meth)acrylate, cyclopentyl (meth)acrylate, 2-ethoxyethyl (meth)acrylate, furfuryl (meth)acrylate, hexafluoroisopropyl (meth)acrylate, methallyl (meth)acrylate, 3-methoxybutyl(meth)acrylate, 2-methoxybutyl (meth)acrylate, 2-nitro-2-methylpropyl (meth)acrylate, n-octyl (meth)acrylate, 2-ethylhexyl (meth) acrylate, lauryl (meth)acrylate, 2-phenoxyethyl (meth) acrylate, 2-phenylethyl (meth)acrylate, phenyl (meth) acrylate, propargyl (meth)acrylate, tetrahydrofurfuryl (meth)acrylate, norbornyl (meth)acrylate, tetrahydropyranyl (meth)acrylate, vinyl acetate, (meth)acrylonitrile, vinyl propionate, vinylidene chloride, (meth)acrylamide, N-methylolacrylamide, and acrylic and methacrylic acids.

Vinyl chloride is copolymerized using procedures known to those skilled in the art of emulsion polymerization. A comprehensive discussion of such techniques is set forth in M. J. Bunten in *Encyclopedia of Polymer Science and Engineering,* 2nd Edn., 1989, Vol 17, p.295, H. F. Mark, N. M. Bikales, C. G. Overberger, and G. Mendes Edrs, which is incorporated herein by reference.

Preferred monomers, employed as core comonomers as described in accordance with the present invention, include methyl acrylate, ethyl acrylate, n-butyl acrylate, methyl methacrylate, ethyl methacrylate, n-butyl methacrylate, vinyl acetate, vinylidene chloride, acrylic and methacrylic acids, and N-methylolacrylamide.

The final core most preferably contains a majority, i.e., more than 50% (by weight) of vinyl chloride. However, a wide range of proportions of vinyl chloride may be used depending upon the desired properties of the resulting core or core phase. The vinyl chloride copolymer in the core, produced from copolymerizing vinyl chloride monomer with one or more other comonomers, typically contains vinyl chloride in an amount of from about 20% to about 100% (all percentages expressed herein are by weight), preferably from about 40% to about 100%, and most preferably from about 60% to about 100%.

The polymeric core may be crosslinked. Crosslinking monomers suitable for use as the cross-linker in the core polymer are known to those skilled in the art, and are generally di- and multifunctional monomers copolymerizable with the other core monomers, as for example, glycol dimethacrylates and acrylates, triol triacrylates and methacrylates and the like. The preferred crosslinking monomers are butylene glycol diacrylates. If crosslinking monomer is employed, it is preferably used at levels of from about 0.05 to about 5%, more preferably 0.05 to about 2%, and still more preferably from about 0.05 to about 1%, based on the total core monomer weight.

Graftlinkers may also be utilized in the core. Graftlinking monomers suitable for use as the graftlinker in the core polymer are also well known, and generally are polyethylenically unsaturated monomers copolymerizable with the other core monomers and having sufficiently low reactivity of the unsaturated groups to allow significant residual unsaturation to remain in the core polymer subsequent to its polymerization, as, for example, allyl methacrylate, diallyl maleate, allyl acryloxypropionate, and the like. The preferred graftlinking monomer is allyl methacrylate. If a graftlinking monomer is employed, it is preferably used at levels from about 0.1 to about 10%, more preferably about 0.1 to about 5%, more preferably from about 0.5 to about 5%, and still more preferably from about 0.5 to about 2.5%, based on the total weight of the core monomers.

Alternatively, the core polymer may be crosslinked and the core polymer may be graftlinked to the shell polymer using other techniques known to those skilled in the art, as, for example, by post-cure reactions. Such a post-cure reaction may be seen when a copolymer is formed from a monomer having a pendant peroxide group, which is then activated by heating to a temperature higher than that used in the polymerization. The activated peroxide group will promote graftlinking and crosslinking of the core-shell polymer components. In another example, a second free-radical initiator may be added to the polymerization. This second initiator is selected to be stable at the initial polymerization temperature, but to be activated by light or a higher temperature subsequent to the initial polymerization.

It will be appreciated that the core or core phase may or may not be crosslinked and/or graftlinked, and if so, to varying extents, depending upon the desired properties of the final core or core phase.

The average particle size, i.e., diameter of the preferred embodiment core, is from about 50 nm to about 600 nm, more preferably from about 50 nm to about 500 nm, and most preferably from about 70 nm to about 300 nm. The particle sizes, as noted herein, are diameters as measured by a Submicron Particle Sizer Autodilute Model 370.

The core component of the preferred embodiment particles exhibits a glass transition temperature Tg greater than about 25° C., preferably above 35° C., and most preferably above 45° C.

The core component comprises from about 25% to about 95% of the total particle weight. Preferably, the core comprises from about 50% to about 90% of the total particle weight. Most preferably, the core comprises from about 65% to about 85% of the total particle weight.

Surrounding the core of the particles are one or more shells. The shell(s) comprise from about 5% to about 75%, preferably from about 10% to about 50%, and more preferably from about 15% to about 35%, of the total particle weight.

As previously noted, the shell phase or phases may be prepared from a wide array of acrylic ester monomers. Preferred acrylics include, but are not limited to, ethyl acrylate, n-butyl acrylate, and combinations thereof. Other examples of suitable acrylic esters include, but are not limited to, isobutyl acrylate, 2-ethylhexyl acrylate, chloroethyl acrylate, ethyl methacrylate, n-butyl methacrylate, isobutyl methacrylate, 2-ethylhexylmethacrylate, and chlorethyl methacrylate. The acrylic monomers utilized preferably exhibit a glass transition temperature of less than about 25° C. Other monomers that may be incorporated into the shell phase, include but are not limited to, vinyl chloride, vinyl acetate, vinylidene chloride, acrylic acid, and N-methylolacrylamide, and hydroxy alkyl (meth)acrylates, such as 2-hydroxy ethyl acrylate or methacrylate.

The one or more shells, or shell phases, also include an acrylonitrile monomer or a monomer containing a cyano group. For the purposes of this application, the term "acrylonitrile monomer" is intended to include any monomer containing a cyano group. In forming the preferred embodiment shells, the acrylic ester monomers are copolymerized with the acrylonitrile monomer, preferably by free radical polymerization. It has been discovered that the use of an acrylonitrile monomer as a comonomer during the shell polymerization stage, significantly improves the degree of phase separation between the PVC-containing core and acrylate-containing shell. In contrast, if the acrylonitrile monomer is not utilized in the shell phase, only one glass transition temperature may be observed which corresponds with the core material. The second glass transition is either very broad or in extreme cases is not detected by the DSC method. Although not wishing to be bound to any particular theory, in the case of a shell phase comprising n-butyl acrylate and without acrylonitrile, and a PVC core phase, the n-butyl acrylate in the shell appears to dissolve in the outer region of the PVC core and thereby creates a particle with an undesirable gradient concentration of poly(n-butyl acrylate) across its diameter or thickness.

It is well known that polyacylonitrile is a polymer highly incompatible with other substances, even with the acrylonitrile monomer itself. This property is widely utilized in many areas where chemical and solvent resistance are required. Although not wishing to be bound to any particular theory, the present inventors contemplate that the use of an acrylonitrile monomer as a comonomer with alkyl acrylates imparts this incompatibility on the polyacrylate to an extent, which is sufficient to cause phase separation. It is believed that the hydrophilicity of acrylonitrile monomer may also contribute to the observed effect.

The amount of the acrylonitrile monomer utilized in the shell is preferably an amount that is effective to induce and maintain phase separation between the shell and core phases. The term "effective amount" as used herein means an amount of the acrylonitrile monomer from about 1% to about 40%. The preferred amount of the acrylonitrile monomer is from about 5% to about 35%, based upon the total weight of the monomers and the acrylonitrile monomer used to form the shell. The preferred range will be influenced by the core composition and the comonomers selected for the shell. Most preferably, the acrylonitrile monomer is utilized in an amount of from about 10% to about 25%.

The shell or shells, preferably comprises a majority amount of the copolymer formed from polymerizing the acrylic monomer and the acrylonitrile monomer. The shell or shells may also comprise a minority amount of one or more other monomers and components regulating polymer molecular weight, such as crosslinking monomers and chain transfer agents.

The core-shell polymer particles useful in the present invention have an outer particle diameter from about 50 nm to about 650 nm, preferably from about 100 to about 500 nm, and most preferably from about 100 nm to about 400 nm.

The shell component of the preferred embodiment particles exhibits a glass transition temperature Tg, of less than about 25° C. Preferably, the shell component of the preferred embodiment particles exhibits a Tg of less than about 10° C., and most preferably, less than about −5° C.

The shell or shells are polymerized onto the previously polymerized cores or core phase using conventional core-shell techniques such as those taught by Owens, U.S. Pat. No. 3,793,402, which is hereby incorporated by reference.

The finished core-shell polymer may be isolated from the emulsion in which it is prepared using conventional techniques such as spray-drying, coagulation, and the like.

In order to improve dispersion of the latex of the present invention in water, or to improve plasticizer resistance of the shell layer(s), hydrophilic monomers may be optionally employed. As such hydrophilic monomers, mention may be made of, for example, acrylamide, and its derivatives such as N-methylol acrylamide, methacrylamide, acrylic acid, methacrylic acid, itaconic acid, maleic acid, fumaric acid, half esters of dibasic acids, hydroxy alkyl acrylates and methacrylates, dimethylaminoethyl (meth)acrylate, dimethylaminopropyl(meth)acrylamide, and the like. These monomers may have been copolymerized with the core polymers beforehand, or utilized as monomer components and with the shell monomers together in forming the shell.

In the shell or shell phase of the core-shell particles, it may, in some instances, be desirable to utilize a conventionally employed water-soluble polymer or polymer latex in such an amount so as to not impair the effects of the present invention. Examples of such polymer include polyvinyl alcohol, carboxymethylcellulose, methyl cellulose, ethyl cellulose, hydroxymethylcellulose, polyacrylamide, starch, dextrin, gelatin, casein, sodium alginate, polyvinyl pyrrolidone, sodium polyacrylate, polyethylene oxide and the like, and derivatives thereof.

Emulsion polymerization usually requires the use of an appropriate surfactant and/or protective colloid to stabilize the emulsion and control the size of the microparticles. The materials are commonly referred to as emulsion stabilizers and dispersing agents. Surfactants or protective colloids which are normally used in the emulsion polymerization of acrylates and vinyls may be used herein. Representative examples include sodium dodecylbenzene sulfonate, ethylene oxide adducts of alkylphenols.

Conventional initiators for the polymerization of acrylates are useful herein such as cumene hydroperoxide, hydrogen peroxide, azobisisobutynonitrile, potassium, sodium or ammonium persulfate, t-butyl hydroperoxide, etc. A wide variety of redox systems can be used to affect polymerization such as t-butylhydroperoxide/sodium formaldehyde sulfoxylate, hydrogene peroxide/iron sulfate, erythorbic acid, and the like. Initiator concentration may range from about 0.1 to 5% by weight.

The surfactants and initiators can be varied in the course of the polymerization process to produce modifications in the properties of the particles produced. Emulsion polymerization processes may be conducted in multiple steps, such as from 2 to 6 stages.

The core-shell particles of the present invention should exhibit relatively low MFFT's and excellent flame retardancy. The particles should have MFFT's of less than 50° C., preferably less than 40° C., and most preferably less than 30° C. The excellent flame retardancy of the particles in accordance with the present invention, is due, at least in part, to the relatively high chlorine content of the particles. Flame retardancy can be achieved when the chlorine content of the particles is at least 20% by weight, with at least 30% and 40% being further preferred. The chlorine content may be entirely in the core or may be distributed between the shell phase(s) and the core. Chlorine can be incorporated in the shell by the use of such monomers as vinylidene chloride.

EXAMPLE 1

Example of the Two-Stage Synthesis in One Reactor

First Stage

A 55-liter pressure-rated stainless-steel stirred reactor containing 9000 grams demineralized water, 135 grams sodium persulfate, and 1750 grams of PVC seed latex (which are compositions that are well known and frequently employed in the art to begin a vinyl chloride polymerization, although the seed need not be PVC and other polymer compositions will work as well) was heated to 53° C. and a mixture of the following components was metered into the reactor over a period of 15 hours: 13600 grams vinyl chloride, 3100 grams vinyl acetate, 170 grams acrylic acid, 170 grams N-methylol acrylamide, 380 grams sodium n-dodecyl benzene sulfonate, 80 grams 28 wt. % aqua ammonia, and 6800 grams DM water.

After metering is completed, a solution of 50 grams tetrasodium pyrophosphate and 330 grams sodium dodecyl diphenyloxide disulfonate in 2800 grams DM water is added to the reactor. The reactor is heated to 65° C. and kept at this temperature for 3 hours.

Second Stage

While maintaining the temperature at 65° C., a solution made of 44 grams ammonium persulfate and 650 grams DM water is added to the reactor and the following components are metered into the same reactor over a period of 3 hours: 4100 grams n-butyl acrylate, 740 grams acrylonitrile, 50 grams acrylic acid, 50 grams N-methylol acrylamide, 25 grams sodium dodecyl diphenyloxide disulfonate, 25 grams sodium n-dodecyl benzene sulfonate, and 2600 grams DM water.

The residual monomers are polymerized by "tailing" the reactor at 72° C. for 3 hours. The last traces of monomers are polymerized by adding to the emulsion 100 grams t-butyl hydrogen peroxide and 200 grams sodium metabisulfite in 700 grams DM water.

The emulsion polymer obtained had 50% wt. solid content as measured by Moister/Solids Analyzer LabWare 9000™)(CEM Corporation), pH=4 as measured by Acumet Basic pH Meter (Fisher Scientific), and 260 nm particle size as measured by Submicron Particle Sizer AutodilutePAT Model 370 (NICOMP Particle Sizing Systems).

FIG. 1 shows the Transmission Electron Microscope (TEM) picture of the latex obtained in Example 1. The sample was prepared as follows. A small amount of latex was drawn into a capillary tube and mixed into appropriately 5 ml of demineralized water. A carbon coated TEM grid is then dipped into the diluted latex/water mixture and immediately transferred onto a cryogenic (liquid nitrogen) stage. The grids and stage remain under vacuum over a period of 2 hours until they reach room temperature. The grids are then examined at the appropriate magnification, using a Philips CM12 Transmission Electron Microscope. As can be seen the latex particles of the present invention includes core-shell particles that are relatively symmetrical and the shell covers substantially all of the core. A lighter acrylic layer is clearly seen surrounding a darker polyvinyl chloride core. But, the present invention is not limited to a symetrical morphology or geometry. Other morphologies or geometries for core-shell particles that are relatively unsymmetrical such as "ice-cream cone" and "strawberry" shaped are included. These other geometrics may occur depending upon the exact processing conditions and the monomers employed in making those latexes.

EXAMPLE 2
Example of the Synthesis with the Use of Presynthesized Core

An emulsion polymer is prepared in a manner identical to Example 1 with the exception that the commercially available (from The B. F. Goodrich Company) vinyl chloride copolymer Vycar®460×95 is used as a core material instead of making the seed or core polymer as was done in the First Stage reaction. Therefore, in this example, the polymerization was begun with the Second Stage.

Second Stage

A five-liter stirred glass reactor equipped with a reflux condenser is charged with 3660 grams Vycar® 460×95 latex and heated to 65° C. Then a solution of 12 grams sodium persulfate in 100 grams DM water is charged to the reactor and a mixture of the following components is metered into the reactor over a period of 3 hours: 550 grams n-butyl acrylate, 63 grams acrylonitrile, 12 grams acrylic acid, 4 grams sodium dodecyl diphenyloxide disulfonate, and 190 grams DM water.

The residual monomers are polymerized by "tailing" the reactor at 72° C. for 1 hour. The last traces of monomers were polymerized by adding sequentially 3 grams t-butyl hydroperoxide and 6 grams sodium formaldehyde sulfoxylate at 57° C.

The resulting polymer latex had a total solids of 53% by weight, a pH of 2.2, and a particle size of 290 nm.

EXAMPLES 3–7
Effect of Acrylonitrile Content in the Shell on the MFFT of the Polymer.

Emulsion polymers were prepared in the manner described in Example 2 with the core being Vycar 460 X 95 polyvinyl chloride copolymer and with the exception that the amount of acrylonitrile was varied as indicated in Table 1. The resulting polymers were tested to determine their MFFT's, which are an indication of the ability of the polymer to form a film. MFFT is measured using a Rhopoint WP-IM-TC9 film forming temperature unit. It is operated by creating a temperature gradient across a platen, and then a polymer film is cast on the platen. After the film has dried, the MFFT is measured as the temperature at which a clear continuous film is no longer present.

TABLE 1

Effect of Acrylonitrile Content in the Shell on the MFFT of the Polymer.

| Example No. | AN content in Shell, wt % | MFFT, ° C. |
|---|---|---|
| 3 | 0 | 40 |
| 4 | 10 | 36 |
| 5 | 15 | 28 |
| 6 | 20 | 45 |
| 7 | 25 | 56 |

The resulting core-shell particles of the present invention exhibit relatively low MFFT's and excellent flame retardancy. The particles exhibit MFFT's of less than 50° C., preferably 40° C., and most preferably 30° C. The results show that there is an optimum amount of acrylonitrile in the shell of the polymer particles which yields the lowest MFFT of the resulting latex polymer.

EXAMPLE 8–21
Glass-Transition Temperature of Acrylic Shell in Core-Shell Latexes.

Emulsion polymers are prepared in a manner described in Example 2 with the use of Vycar® 460X95 latex as core polymers. For comparison, the acrylic "shell" copolymers of latexes were synthesized in the absence of a core or seed particle, that is, it was (as it will hereinafter be referred to as) "isolated", but having the same acrylonitrile/n-butyl acrylate copolymer composition as the acrylic shell in the core-shell polymers. The glass transition temperatures of the "isolated" shell copolymers are included in the details which are summarized in Table 2.

TABLE 2

Glass-Transition Temperature of Acrylic Shell in Core-Shell Latexes.

| Ex. No. | Shell, % | AN, % | Tg, ° C. | "Isolated" Shell Copolymer, Tg, ° C. |
|---|---|---|---|---|
| 8 | 25 | 0 |  | −55 |
| 9 | 25 | 5 | −11 | −42 |
| 10 | 25 | 10 | 8 | −36 |
| 11 | 25 | 15 | 16 | −25 |
| 12 | 25 | 20 | 16 | −23 |
| 13 | 25 | 30 | 9 | 3 |
| 14 | 25 | 40 | 34 | 12 |

As can be seen from the results, the latexes of the present invention, which contain 33.6% by weight chlorine, achieve Tg's closer to the Tg's of the "isolated" shell copolymer, as the acrylonitrile content of the shell is increased. As a comparison, Airflex® 4530, which is an ethylene-vinyl chloride copolymer, contains 44% chlorine, and a Tg of 30° C.

EXAMPLES 15–21
Glass-Transition Temperature of Acrylic Shell in Core-Shell Latexes.

Emulsion polymers are prepared in a manner described in Example 2 with the exception that Vycar® 150X21 latex was used as the core polymer. Vycar® 150X21 latex is a polyvinyl chloride homopolymer latex that is commercially available from The B. F. Goodrich Company. Particular details are summarized in Table 3.

TABLE 3

Glass-Transition Temperature of Acrylic Shell in Core Shell Latexes.

| Ex. No. | Shell % | AN, % | Tg, ° C. | % Chlorine | "Isolated" Shell Copolymer, Tg, ° C. |
|---|---|---|---|---|---|
| 15 | 25 | 0 | −26 | 42 | −55 |
| 16 | 25 | 10 | −5 | 42 | −36 |
| 17 | 25 | 20 | 10 | 42 | −23 |
| 18 | 25 | 40 | 23 | 42 | 12 |
| 19 | 33 | 0 | −28 | 37.5 | |
| 20 | 33 | 7 | −8 | 37.5 | |
| 21 | 33 | 25 | 8 | 37.5 | |

As can be seen from the results, the use of acrylonitrile in the shell copolymers achieves the same effect using a polyvinyl chloride homopolymer core as does a copolymer core in Examples 8–14. The latexes of the present invention, having acceptable chlorine levels, provide flame retardancy. Further, varying the amount of shell polymer still produced acceptable performance.

Figure 2:
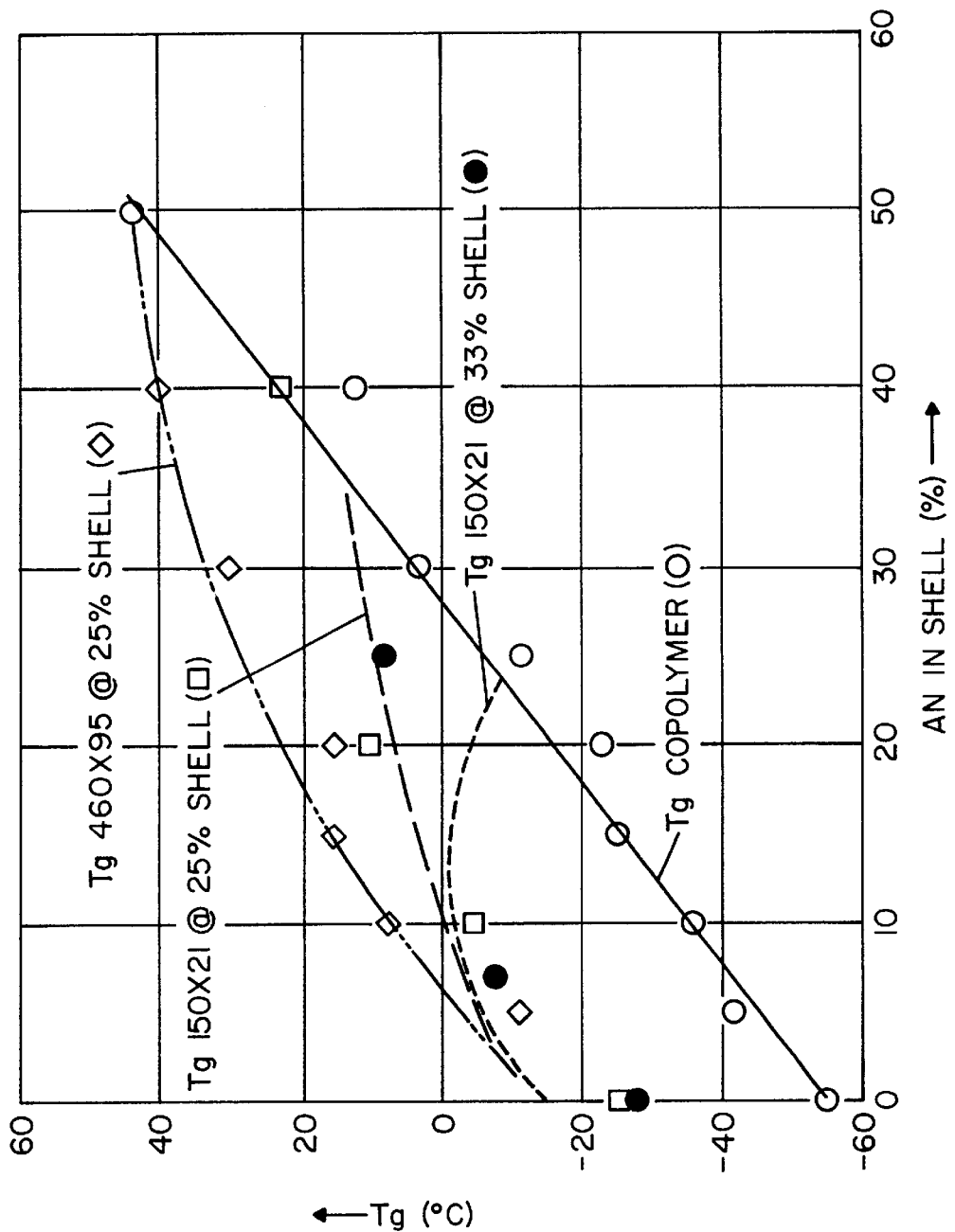
FIG. 2 is a graph of differential scanning calorimetry data which shows the effect of acrylonitrile content on the glass transition temperature of the latex of the present invention as compared to the "isolated" shell copolymer.

FIG. 2 shows a comparison of the glass-transition temperatures for the acrylonitrile/n-butyl acrylate copolymer shell in core-shell latexes with those for the "isolated" shell copolymers, which have been synthesized under the same conditions, but in the absence of a PVC core. These values are reported in the results in Tables 2 and 3. The "isolated" shell copolymers demonstrate a linear relationship between the weight fraction of acrylonitrile and Tg. The picture changes dramatically when the same copolymers are made as a shell around PVC core. At acrylonitrile contents of 10–15%, the Tg of the shell is about 30° C. higher than that of "isolated" acrylonitrile—n butyl acrylate copolymers of the same composition. As the amount of acrylonitrile is increased the data points for the core-shell polymer approaches those for "isolated" acrylonitrile—n butyl acrylate copolymer, and starts to align with the data points for the "isolated" copolymer. In the latexes of the present invention, we attribute this phenomenon of the phase separation of the acrylic shell from the PVC core to the inclusion of the acrylonitrile.

EXAMPLES 22–39

Application Examples

Additional emulsion polymers are prepared in a manner set forth in Example 1 with the core and shell compositions indicated. In addition vinylidene chloride (VDCl) is used in some experiments to increase the chlorine content in the polymer. These polymers are compared with a "benchmark" polymer, namely, Airflex® 4530 polymer, which is an ethylene/vinyl chloride copolymer, is used as a flame-retardant binder, and is commercially available from Air Products & Chemicals.

Nonwovens employing the polymers of the present invention were tested for % LOI, Heat Seal Bond Strength and Compression Recovery. The results are reported in Table 4. In addition the LOI of the polymers, per se, were determined for Examples 31, 32, 34, 38, and 39, and the results were 26%, 24%, 26%, 25%, and 26%, respectively.

The % Limiting Oxygen Index was determined using ASTM D2863-95 (Standard Test Method for Determining Oxygen Concentration to Support Candle-like Combustion of Plastics (Oxygen Index)). Each polymer was sprayed onto both sides of a 100% polyester nonwoven substrate, at an add-on of 15% for each side, and cured at 212° F. for 5 minutes. Limiting Oxygen Index is the minimum concentration of oxygen required to support flaming combustion; the samples were considered self-supporting plastics. Films were also drawn for several of the polymers (including the benchmark polymer); the films were dried at 95° C. for 45 minutes and tested for LOI of the polymer alone.

Heat Seal Bond Strength measures the strength of the polymer bond over a range of temperatures. Each polymer was skim-coated onto a 65/35 polyester/cotton blend fabric at an add-on weight of 2.5–3.4 ounces per square yard. Two strips of the coated side of the fabric (same polymer on each strip) were laid against each other, then exposed to a specified temperature and pressure for 30 seconds. The delamination strengths of the sealed zones of the strip were measured using a Thwing-Albert.

Recovery refers to the percent of the original height that is restored when a stack of 6 sprayed polyester nonwoven pieces (3 in. by 3 in.) is exposed to a 3 in. by 3 in 500 g weight for 24 hours, then allowed to "de-compress" for 30 minutes. Nonwoven substrate preparation was the same as that for Limiting Oxygen Index.

TABLE 4

Application Tests

| Example No. | Core Composition, % by Weight | | Shell Content | Shell Composition, % by Weight | | Calculated | Hot Bar Heat Seal Bond Strength | | % Recovery | Limiting Oxygen Index % |
|---|---|---|---|---|---|---|---|---|---|---|
| | VCl | VDCl | % | Acrylontrile | VDCl | % Cl | 325° F. | 250° F. | (24 hour) | (For the Nonwoven) |
| 22 | 80 | 0 | 22.5 | 15 | 0 | 36 | 8.89 | 5.58 | 90.0 | 18.0 |
| 23 | 80 | 0 | 22.5 | 15 | 10 | 37 | 9.06 | 4.52 | 92.3 | 17.0 |
| 24 | 91 | 0 | 22.5 | 15 | 0 | 40 | 7.02 | 3.45 | 92.6 | 18.5 |
| 25 | 98 | 0 | 22.5 | 15 | 0 | 43 | 5.55 | 2.87 | 92.3 | 18.0 |
| 26 | 91 | 0 | 20.0 | 15 | 0 | 42 | 7.87 | 3.67 | 89.3 | 18.0 |
| 27 | 91 | 0 | 16.7 | 15 | 0 | 43 | 8.14 | 3.39 | 92.3 | 18.0 |
| 28 | 76 | 15 | 22.5 | 15 | 0 | 42 | 5.84 | 4.00 | 87.7 | 19.0 |
| 29 | 91 | 0 | 16.7 | 15 | 10 | 45 | 6.72 | 2.54 | 90.6 | 19.0 |
| 30 | 91 | 0 | 20.0 | 15 | 10 | 44 | 7.69 | 3.45 | 90.9 | 20.0 |

TABLE 4-continued

Application Tests

| Example No. | Core Composition, % by Weight VCI | Core Composition, % by Weight VDCI | Shell Content % | Shell Composition, % by Weight Acrylontrile | Shell Composition, % by Weight VDCI | Calculated % Cl | Hot Bar Heat Seal Bond Strength 325° F. | Hot Bar Heat Seal Bond Strength 250° F. | % Recovery (24 hour) | Limiting Oxygen Index % (For the Nonwoven) |
|---|---|---|---|---|---|---|---|---|---|---|
| 31 | 80 | 0 | 22.5 | 5 | 10 | 38 | 7.98 | 3.66 | 92.6 | 18.0 |
| 32 | 80 | 0 | 16.7 | 5 | 0 | 38 | 8.42 | 3.95 | 91.4 | 18.0 |
| 33 | 98 | 0 | 16.7 | 5 | 0 | 47 | 3.63 | 1.25 | 90.0 | 19.0 |
| 34 | 98 | 0 | 22.5 | 5 | 10 | 46 | 5.13 | 2.36 | 87.3 | 18.0 |
| 35 | 80 | 0 | 16.7 | 5 | 5 | 39 | 9.19 | 3.98 | 88.5 | 18.0 |
| 36 | 80 | 0 | 19.3 | 10 | 0 | 37 | 8.65 | 2.74 | 90.9 | 19.0 |
| 37 | 80 | 0 | 16.7 | 5 | 10 | 40 | 8.29 | 0.00 | 92.7 | 18.0 |
| 38 | 89 | 0 | 22.5 | 10 | 5 | 41 | 7.12 | 3.59 | 92.2 | 18.0 |
| 39 | 98 | 0 | 22.5 | 5 | 0 | 43 | 4.98 | 2.44 | 91.7 | 19.0 |
| Benchmark | N/A | N/A | N/A | N/A | N/A | 44 | 9.50 | 5.76 | 88.2 | 18.0 |

The results in Table 4 demonstrate that the latexes of the present invention provide both flame retardancy and good application properties because of the heat seal bond strengths and recovery values. The LOI values for the polymers which were evaluated demonstrate that they have good value for use as flame retardant polymers (e.g., the LOI's were between 24% and 26%), especially when compared to the Benchmark (Airflex® 4530 polymer) which has a LOI of 25%.

By restating results from Table 4, as Table 5, to show the results based upon increasing % of chlorine, a comparison can be made to show that the latexes of the present invention provide superior flame retardancy with lower chlorine content than ethylene-vinyl chloride polymers.

TABLE 5

| Example No. | % Cl | Limiting Oxygen Index |
|---|---|---|
| 23 | 37 | 17.0 |
| 22 | 36 | 18.0 |
| 31 | 38 | 18.0 |
| 32 | 38 | 18.0 |
| 35 | 39 | 18.0 |
| 37 | 40 | 18.0 |
| 38 | 41 | 18.0 |
| 26 | 42 | 18.0 |
| 25 | 43 | 18.0 |
| 27 | 43 | 18.0 |
| 34 | 46 | 18.0 |
| 24 | 40 | 18.5 |
| 36 | 37 | 19.0 |
| 28 | 42 | 19.0 |
| 39 | 43 | 19.0 |
| 29 | 45 | 19.0 |
| 33 | 47 | 19.0 |
| 30 | 44 | 20.0 |
| Benchmark | 44 | 18.0 |

EXAMPLES 40–43
Mechanical Stability Tests

Emulsion polymers were prepared in a manner identical to Example 2 using Vycar 460X95 polyvinyl chloride copolymer as the core. One gram of each latex was placed in a Thomas tissue grinder (Model No. 3431/Teflon Pestle). The test was conducted at 150 rpm for 30 minutes, unless latex instability required an early halt to the test. Formation of coagulum or skins and/or generation of heat within the tube indicated mechanical instability. The results are reported in Table 6.

TABLE 6

Mechanical Stability Tests

| Example No. | Tissue Grinder Stability | Shell AN phr | % Shell | Seed | Particle Size (nm) |
|---|---|---|---|---|---|
| 40 | Fine coagulum throughout | 0 | 22.5 | 0.70 of standard | 295 |
| 41 | No coagulum | 10 | 22.5 | 0.70 of standard | 290 |
| 42 | No coagulum | 15 | 22.5 | 0.70 of standard | 286 |
| 43 | Less than 5 pieces coagulum | 25 | 22.5 | 0.70 of standard | 292 |

EXAMPLES 44–49
Further Stability Tests

The same stability tests, that were run in Examples 40–43, were run with latexes which were prepared in the manner identical to Example 2, with the exception that the % of acrylonitrile was held constant and the seed was varied. The results are reported in Table 7.

TABLE 7

Further Stability Tests

| Example No. | Tissue Grinder Stability | Shell AN phr | % Shell | Seed | Particle Size (nm) |
|---|---|---|---|---|---|
| 44 | 1–2 pieces coagulum | 15 | 17 | standard | 259 |
| 45 | No coagulum | 15 | 17 | standard | 256 |
| 46 | No coagulum | 15 | 14 | 1.25 × standard | 244 |
| 47 | 1–2 pieces coagulum | 15 | 25 | 0.70 of standard | 272 |
| 48 | No coagulum | 15 | 17 | 0.70 of standard | 279 |
| 49 | No coagulum | 15 | 17 | 0.70 of standard | 284 |

As can be seen from the tissue grinder results of Tables 6 and 7, the only polymer exhibiting poor mechanical stability was the one whose shell contained no acrylonitrile;.

As can be appreciated, the polymers of the present invention provide excellent mechanical stability, excellent heat sealability, relatively low film forming temperatures, and very good flame retardancy. These properties suggest a wide variety of applications which could use the polymers of the present application.

The emulsion polymers of the present invention can be used in many application areas, such as paper, coatings, nonwovens, textiles, medical products, adhesives and graphic arts. More particularly, the applications include, but are not limited to highloft nonwovens for automotive parts, filtration, furniture and insulation; nonwoven scrub pads, glass mat binders for roofing, facer sheets, building and industrial mats; fiber glass scrim; fiber sizing; specialty paper coatings and saturants; moldable filter papers; heat sealable paper coatings; paper sizing; glove dipping or coating; laminating adhesives for paper and films; laminating inks; wallcoverings; flooring base coats; blister pack packaging; flame retardant textile coating and saturants; flame retardant flock adhesives and flame retardant oversprays. Methods of application include spraying, coating, saturation, beater addition, flocking and other processes known to those skilled in the art for the manufacture of these goods. Although the present invention polymers are described herein as emulsion polymers, the present invention includes systems in which the polymers exist in other states such as a suspension. The latexes of the present invention can be combined with other conventional ingredients such thickeners, fillers, softeners, crosslinkers, fluorochemicals, pigments, stabilizers, leveling aids, wetting aids, and the like to modify the latex to accommodate the particular application.

The present invention also includes incorporating acrylonitrile into the core phase to promote phase separation of the core and shell components. Accordingly, the present invention includes core-shell configurations in which an acrylonitrile monomer is incorporated in either or both of the shell phase and/or the core phase.

The foregoing description is, at present, considered to be the preferred embodiments of the present invention. However, it is contemplated that various changes and modifications apparent to those skilled in the art, may be made without departing from the present invention. Therefore, the foregoing description is intended to cover all such changes and modifications encompassed within the spirit and scope of the present invention, including all equivalent aspects.

What is claimed is:

1. A core-shell particle comprising:
   a polymeric core component, said core component comprising a vinyl chloride homopolymer or copolymer; and
   a polymeric shell component disposed generally about said core component, said shell component formed from (i) at least one acrylate monomer, and (ii) an effective amount of monomer containing a cyano group, in the range of from about 1% by weight to about 40% by weight, based upon the total weight of the at least one acrylate monomer and the monomer containing a cyano group, to promote thereby separation between said shell component and said core component.

2. The core-shell particle of claim 1 wherein said core component constitutes from about 25% to about 95% of the total weight of said particle.

3. The core-shell particle of claim 2 wherein said core component constitutes from about 50% to about 90% of the total weight of said particle.

4. The core-shell particle of claim 3 wherein said core component constitutes from about 65% to about 85% of the total particle weight.

5. The core-shell particle of claim 1 wherein said shell component constitutes from about 5% to about 75% of the total weight of said particle.

6. The core-shell particle of claim 5 wherein said shell component constitutes from about 10% to about 50% of the total weight of said particle.

7. The core-shell particle of claim 6 wherein said shell component constitutes from about 15% to about 35% of the total weight of said particle.

8. The core-shell particle of claim 1 wherein said monomer containing a cyano group is an acrylonitrile monomer.

9. The core-shell particle of claim 8 wherein said effective amount of arylonitrile monomer ranges from about 5% to about 35%.

10. The core-shell particle of claim 9 wherein said effective amount of acrylonitrile monomer ranges from about 10% to about 25%.

11. The core-shell particle of claim 1 wherein said particle exhibits a MFFT of less than 50° C.

12. The core-shell particle of claim 11 wherein said particle exhibits a MFFT of less than 40° C.

13. The core-shell particle of claim 1 wherein the chlorine content of said particle is at least 20% by weight based upon the weight of the polymers.

14. The core-shell particle of claim 13 wherein said chlorine content of said particle is at least 30% by weight based upon the weight of the polymers.

15. The core-shell particle of claim 13 wherein said chlorine content of said particle is at least 40% by weight based upon the weight of the polymers.

16. The core-shell particle of claim 1 wherein the size of said core component ranges from about 50 nm to about 650 nm.

17. The core-shell particle of claim 15 wherein the size of said core component ranges from about 100 nm to about 500 nm.

18. The core-shell particle of claim 16 wherein the size of said core component ranges from about 100 nm to about 400 nm.

19. The core-shell particle of claim 1 wherein said core component exhibits a glass transition temperature greater than about 25° C.

20. The core-shell particle of claim 18 wherein said core component exhibits a glass transition temperature greater than about 35° C.

21. The core-shell particle of claim 19 wherein said core component exhibits a glass transition temperature greater than about 45° C.

22. The core-shell particle of claim 1 wherein said shell component exhibits a glass transition temperature less than about 25° C.

23. The core-shell particle of claim 22 wherein said shell component exhibits a glass transition temperature less than about 10° C.

24. The core-shell particle of claim 23 wherein said shell component exhibits a glass transition temperature less than about −5° C.

25. The core-shell particle of claim 1 wherein said core-shell particle further comprises a plurality of shell components, each disposed about said core component.

26. The core-shell particle of claim 1 wherein said acrylate monomer is selected from the group consisting of methyl acrylate, ethyl acrylate, n-butyl acrylate, methyl methacrylate, ethyl methacrylate, n-butyl methacrylate, and combinations thereof.

27. The core-shell particle of claim 1 wherein said core component comprises vinyl chloride in an amount of from about 20% to about 100% based upon the weight of said core component.

28. The core-shell particle of claim 27 wherein said core component comprises vinyl chloride in an amount of from about 40% to about 100%.

29. The core-shell particle of claim 28 wherein said core component comprises vinyl chloride in an amount of from about 60% to about 100%.

30. The core-shell particle of claim 1 wherein the size of said core-shell particle ranges from about 50 nm to about 650 nm.

31. The core-shell particle of claim 30 wherein the size of said core-shell particle ranges from about 100 nm to about 500 nm.

32. The core-shell particle of claim 31 wherein the size of said core-shell particle ranges from about 100 nm to about 400 nm.

33. A latex having core-shell particles comprising:

a polymeric core component, said core component comprising a vinyl chloride homopolymer or copolymer; and a polymeric shell component disposed generally about said core component, said shell component formed from (i) at least one acrylate monomer, and (ii) an effective amount of monomer containing a cyano group, in the range of about 1% by weight to about 40% by weight based upon the total weight of the at least one acrylate monomer and said monomer containing a cyano group, to promote thereby separation between said shell component and said core component.

* * * * *